United States Patent Office 3,254,048
Patented May 31, 1966

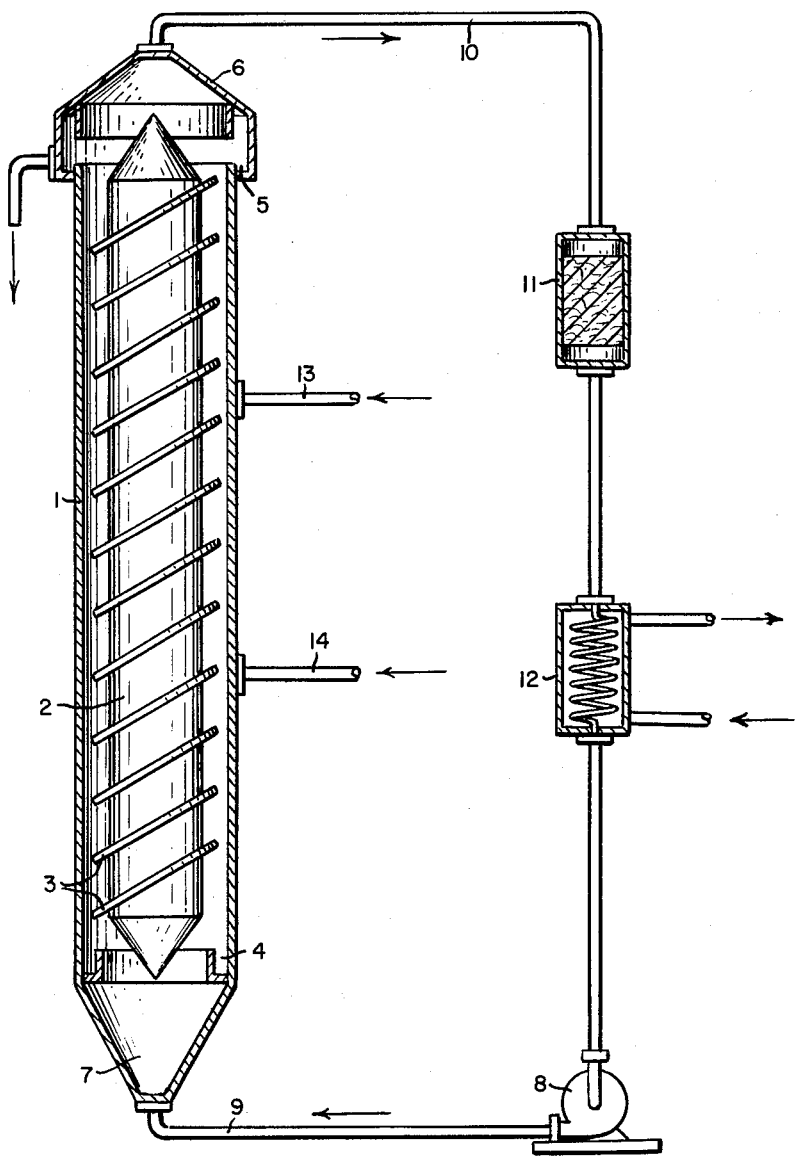

3,254,048
PROCESS FOR SEPARATING AT LEAST TWO IM-
MISCIBLE LIQUIDS BY CAUSING INTERPENE-
TRATION AND INTERMIXING OF LIQUIDS OF
DIFFERENT DENSITIES
Franz Schaub, Oberhausen-Holten, Josef Hibbel, Ober-
hausen-Sterkrade, and Bernard Schleper, Oberhausen-
Holten, Germany, assignors to Ruhrchemie Aktienge-
sellschaft, Oberhausen-Holten, Germany
Filed Dec. 24, 1963, Ser. No. 336,096
19 Claims. (Cl. 260—33.6)

The invention relates to a method of interpenetrating and intermixing of liquids having different densities and to a suitable device therefor. More particularly, it relates to a method wherein a continuous and thorough intermixing is effected by a stowing and damming effect upon the liquids and by a continuous interchange of liquid film formed and dispersed phase, produced thereby. The invention is a continuation-in-part of our co-pending application Serial Number 1,157, filed January 7, 1960, and now abandoned.

In a known process and device for treating gases with liquids, the liquid and gaseous media flow through a vertical tube where they are imparted a vigorous rotary motion by means of screw-shaped or similar devices. The liquid media may be collected at the upper or lower end of the tube by means of annular containers, and, if desired, recycled into the gas treating operation. This mode of operation can be used with particular advantage for washing and wet-purifying gases, it being possible to impound the washing liquid in the zone of the gas rotary motion to a greater or lesser extent by suitably adjusting the gas flow rate or the cross-sectional area of the gas passage.

It has been found that this method and the devices used for performing it are also suitable for effecting interpenetration and intermixing of substantially non-gaseous liquids. While it is true that every liquid is present also to a slight extent in gaseous form, this may be disregarded for practical purposes, and essentially non-gaseous liquids are present and used in the method according to the invention. To this end, the liquids to be mixed, at a common point or at separated points, are introduced into a vertical tube equipped with fixtures which, with the simultaneous passage of an ascending air or gas stream, cause a vigorous rotary and turbulent movement of the liquid and gaseous components present in the tube and at the same time a partial impounding of the liquids. The turbulence and impounding of the liquids in the treating zone are substantially brought about by the kinetic energy of the inflowing gaseous medium which flows in upward direction. It is preferably introduced at the base of the tube and led off at its top. It is also possible to operate with recycling of the gaseous medium. In this case, devices for drying, heating or regeneration of the gaseous medium may be inserted in the gas cycle.

In contradistinction to known processes and devices, wherein a countercurrent contact between one fluid medium and another is effected by working in a flooded condition, i.e., at a predetermined liquid level, in the process and the device according to the invention two mutually immiscible liquid phases are brought in contact with each other and with a gas, whereby no liquid column is formed.

In the device according to the invention guide vanes are installed which are used solely for the purpose to impart a rotary motion to the gas. The liquid phases thereby move in an inclined spiral flow, the angle involved being dependent upon the gas velocity and the amount of the liquid, but not being identical with the angle of pitch of the guide vanes. By the movement of the gas a stowing, damming or piling up of the liquid phases is obtained, that means, a film of liquid is maintained at the outer wall of the annular space. By the shearing action of the gas, the film is dispersed in radial direction into droplets, so that in radial direction zones are formed, wherein the liquid media and the gas are present in dispersed phase. By the action of centrifugal force, the extremely finely dispersed liquid particles are continually driven back into the film, so that by the cooperation of the shearing action of the flowing gas with the centrifugal force a continuous interchange of liquid between the uninterrupted film and the dispersed phase occurs. Thereby, an especially intimate contact of the liquid phases with each other and with the gas is obtained. Thus, the interaction of the participants is of considerably higher intensity that in known processes which are carried out in devices operated in flooded condition.

The invention therefore does not simply rely on a countercurrent contact of the respective liquids but ascribes its success primarily to the damming effect obtained with the device as described in detail below.

Devices proposed by prior art do not teach the stowing or damming effect instantly used, hence, rely on a different principle. Usually, guide vanes, particularly those in the form of continuous helicoidal surface, partition the tube and make contact with the inside of the outer wall (see, for instance, Cooley, U.S. 2,988,429, June 13, 1961; Haller, U.S. 2,585,385, February 12, 1952). Such insertion of a spiral in a contact tower merely seals off a direct path through the same but cannot produce the stowing, or damming, effect.

The liquids to be treated may contain solid materials in dissolved, emulsified or suspended form. One of the two liquids may function as the reaction medium, extraction agent or solvent for the other liquid or for the solid materials contained therein. The liquids may also be used separately or commonly as cooling or heating medium for the gaseous medium flowing through.

It furthermore is feasible to mix liquids which react with each other, or liquids one of which is an extractant or else a solvent for the other, or a solvent for the gas used; and it also is feasible to use one or both liquids as cooling media for said gas.

The liquids to be mixed may dissolve out individual components from the gaseous medium or enter into an exchange relation with the gaseous media in a different manner. Thus, for example, a chemical reaction and/or a simultaneous heat exchange between the gas and the liquids may be effected.

The devices for carrying out the process of the invention are not equipped with mechanical drives or moving structural members. For this reason, the new process is with particular advantage applicable to the treatments using corrosive gases or liquids for which metallic materials are unsuited. All parts of the apparatus may be made of ceramics or plastic materials, especially polyethylene.

As an alternative, the device for carrying out the process of the invention may be designed so that the zone of intermixing and interpenetration of the two liquids is followed by separatory sections for the two liquid phases. In this manner, the liquid of lower specific gravity can be withdrawn in unmixed state at the top and the liquid of higher specific gravity can be withdrawn at the base of the tube. In doing so, efficient countercurrent flow of the two liquids can be achieved as is advantageous for the extraction of liquids.

One embodiment of the device which is suitable for carrying out the process of the invention is shown in the accompanying drawing in form of a diagrammatic vertical sections.

Referring to the drawing, within a vertical tube 1 there is provided a cylindrical body or tube 2 having conical sections at the top and at the base and equipped at its surface with guide vanes 3 which, for example, may be designed as helicoidal surfaces, interrupted helicoidal surfaces or paddle vanes. These vanes do not contact the inner wall of tube 1 but leave a space therebetween. The diameter of the body 2 is such that a sufficiently large annular clearance is provided for the passage of the gaseous and liquid media.

At the lower edge of the tube 2 a ring-shaped channel 4 for collecting liquids is provided. The liquids flowing over at the top of the tube 2 collect in a ring-shaped channel 5 arranged about the periphery of the tube. At the top and at the base the reaction tube 2 is closed by hood-shaped sections 6 and 7 which are provided with pipe connections for introducing and withdrawing the gaseous medium. The gases are admitted through line 9 by means of a blower 8. The gases flowing off at the top of the device pass through line 10 into, for example, an absorbing or purifying device 11 of which, in conventional manner, a plurality may be provided which may be used singly in rotation thereby permitting drying, regeneration or other treatment by adsorbing or purifying agents. It is also possible to use continuously operating spraying devices for this purpose. Moreover, the gases flow through a cooling or heating device 12 by means of which the gas temperature required is adjusted.

The liquid of higher specific gravity (such as water, acids or salt solutions) is admitted through line 13, while the liquid of lower specific gravity (such as hydrocarbons, alcohols or other organic solvents) is introduced through line 14. Due to its higher density, the liquid admitted at 13 tends to flow off in downward direction while the liquid of lower specific gravity introduced at 14 flows in upward direction due to hydrostatic buoyancy. Both of the liquids interpenetrate in this manner while the upflowing gas stream being present at the same time effects impounding and further intermixing of the two liquids.

By suitably designing the guide members 3 arranged on the body 2 which preferably is cylindrical, the heavy liquid introduced through line 13 can be caused to move downwardly at a low rate only. At the same time, the liquid of lower density flowing in through line 14 moves in upward direction. While the central tube section is intended for intimate intermixing of the reactants, separation of the liquids is intended to occur in the tube sections located above line 13 and below line 14 in order that the separated liquids, by means of the collecting members 4 and 5, flow off in as pure a form as possible. In this case, the upper and lower sections of the body 2 may be free of guide members or may have a smaller diameter, or a lower number of guide vanes, or guide vanes of lesser inclination, may be provided in these sections.

In special cases, the liquid or lower specific gravity may enter through line 13 and the liquid of higher specific gravity may enter through line 14. In this case, the gas stream causes only partial mixing of the two liquids. This mode of operation is of particular advantage in cases when successive washing and treating of gases with different liquids is to be carried out.

The process of the invention and the device used for carrying out this process can be used with particular advantage for washing alcohols which contain dissolved salts in addition to free hydrochloric acid. Alcohol solutions of this type are obtained, for example, in the purification of pulverulent polyethylene suspended in hydrocarbons, especially low-pressure polyethylene. Up to the present, polyethylene-hydrocarbon suspensions containing hydrochloric acid in addition to alcohol were allowed to rise in drops through a slowly outflowing water layer. In doing so, the alcohol, hydrochloric acid and dissolved salts present are extracted by the water. However, this extraction process is very slow and incomplete because the liquid media move in form of relatively large drops and at a low relative velocity only. Therefore, the prior art processes require comparatively voluminous equipment to obtain a fairly satisfactory washing effect. The device of the invention avoids these disadvantages because the pulverulent polyethylene and also the suspending liquids are freed from undesirable components in a substantially smaller space and to a considerably higher extent. Subsequent further purification of the pulverulent polyethylene is generally unnecessary.

Several devices according to the invention may be connected in series. In this case, after each separation of the liquid and, if present, of the pulverulent components, a repeated and, if desired, several repeated countercurrent passages of the media involved are accomplished.

The invention now will be further explained with the aid of the following example. However, it should be understood that this is given merely by way of illustration, and not of limitation, and that numerous changes may be made in the details without departing from the spirit and the scope of the invention as hereinafter claimed. Particularly, the invention is not limited to the application to polyethylene suspensions but can equally well be employed for use with any other suspension or emulsion or solution.

*Example*

The treatment of a polyethylene-heavy-benzine-suspension was carried out in a device according to the accompanying drawing consisting of a vertical tube 1 having an inner diameter of 140 mm., provided with a coaxial cylindrical body 2 having a diameter of 50 mm., equipped at its surface with guide vanes 3 having an angle of inclination to the perpendicular of the longitudinal axis of the cylindrical body of 30°.

80 kg. of the polyethylene-heavy-benzine-suspension containing 25% polyethylene, 0.8% HCl and small amounts of alcohol, were introduced per hour into the annular space between the vertical tube and the coaxial cylindrical body through inlet 14. About the 1.6-fold amount of water was admitted at a distance 1500 mm. above the entrance point of the polyethylene-heavy-benzine-suspension through inlet 13. Above the entrance point of the heavy phase and below the entrance point of the light phase, separatory sections for the two liquid phases of 500 mm. length respectively were provided.

A gas was admitted into the lower part of the device with an axial velocity of 3 m./sec. dependent upon the free cross section of the annular space. The aqueous phase flowed off the bottom collector 4 with a content of 0.5% HCl, small amounts of alcohol and traces of polyethylene and benzine. The polyethylene-heavy-benzine-suspension flowing off the top collector 5 contained only 50 p.p.m. HCl and about 2.5% water in emulsified form; alcohol was not detectable therein.

We claim as our invention:

1. A process of separating at least two immiscible liquids having different densities which comprises interpenetrating and intermixing said liquids by passing them into a confined space in a vertical tube provided with guide means, entering a gas in ascending direction below said guide means and passing the same upward through said confined space thereby producing a damming effect and imparting, with the aid of said guide means, to said liquids and gas a vigorous rotary motion with simultaneous partial impounding of said liquids; said damming effect continuously producing a film on the outer wall of said confined space which immediately disperses into fine droplets, due to the shearing action of the gas, and continuously reforms, thus producing a continuous interchange of liquid between said film and dispersed phase.

2. The process as defined in claim 1, wherein said liquids are fed into said confined space jointly.

3. The process as defined in claim 1, wherein said liquids are fed into said confined space separately.

4. The process as defined in claim 1, wherein said liquids move countercurrently.

5. The process as defined in claim 1, wherein said liquids contain solid matter.

6. The process as defined in claim 5, wherein said solid matter is dissolved in said liquids 7. The process as defined in claim 5, wherein said solid matter is suspended in said liquids.

8. The process as defined in claim 1, wherein one of said liquids is a reactant for the other liquid.

9. The process as defined in claim 1, wherein one of said liquids is an extracting agent for the other liquid.

10. The process as defined in claim 1, wherein one liquid is a solvent for the other liquid.

11. The process as defined in claim 1, wherein at least one of said liquids is used as cooling medium for said gas.

12. The process as defined in claim 1, wherein said liquids are solvents for individual components of the gas.

13. The process are defined in claim 1, wherein said gas passed through said liquids is removed after passing, is dried, regenerated, heated and recycled into the process.

14. A process for the purification of powdered polyethylene suspended in a liquid hydrocarbon, which comprises conducting the suspension into the lower section of a vertical cylindrical tube provided with guide vanes, introducing a gas into said tube at a point below said suspension in an upward flow and introducing water into the upper section of said tube; the suspension, water and gas meeting countercurrently in a turbulent rotary motion induced by said guide vanes which also impart, together with the flow of the gas, a damming effect upon suspension, water and gas, with partial impounding of suspension and water; the water, containing alcohol, hydrochloric acid and salts extracted from said suspension, being collected at the bottom of said tube and the polyethylene suspension thus purified at its top; said damming effect continuously producing a film on the wall of said tube which immediately disperses under the shearing action of said gas and continuously reforms thus effecting a continuous interchange of liquid between said film and the dispersed phase.

15. A device for separating immiscible liquids of different densities after intermixing and interpenetrating with the aid of the passage of gases, which comprises, in combination, a vertical tube; a cylindrical body, ending in a cone at its top and at its bottom, disposed coaxially within said vertical tube; guide vanes disposed on the outer surface of said cylindrical body and extending toward, but not contacting, the inner wall of said tube; a ring-shaped collector for liquids of lower density on top of said vertical tube; a ring-shaped collector for liquids of higher density at the bottom of said vertical tube; inlet means for said liquids into said tube; outlet means for said liquids from said collectors; and inlet and outlet means for said gases into and out of said tube; said guide vanes, under the action of said gas, causing turbulent rotary motion of said liquids and producing a damming effect thereon thus continuously producing a film on the wall of said tube which immediately disperses under the shearing action of said gases and continuously reforms thus effecting a continuous interchange of liquid between said film and the dispersed phase.

16. The device as claimed in claim 15, wherein the inlet means for the liquid of higher density into said vertical tube is disposed near the upper end of said vertical tube, the space between said inlet means for liquids of higher density and the upper end serving as a separating zone for separation of gas from said liquid of higher density; and wherein said inlet means for the liquid of lower density is disposed near the lower end of said vertical tube, the space between said two inlets serving as a separating zone for the separation of said liquids of higher density from said gas.

17. The device as defined in claim 15, wherein said guide vanes are continuous.

18. The device as defined in claim 15, wherein said guide vanes are disposed solely at the mid-section of the outer surface of said cylindrical body.

19. A device for the purification of polyethylene suspended in a liquid hydrocarbon and containing small amounts of alcohol and HCl, by intermixing with water by means of the passage of a gas, which comprises, in combination, a vertical tube; a cylindrical body, ending in a cone at its top and at its bottom, disposed coaxially within said vertical tube; guide vanes disposed on the outer surface of said cylindrical body and extending toward, but not contacting, the inner wall of said tube; a ring-shaped collector on top of said tube for the liquid hydrocarbon plus polyethylene; a ring-shaped collector on the bottom of said tube for said water plus alcohol and HCl; inlet means for said hydrocarbon containing polyethylene at substantially the lower third, and for water at substantially the upper third, of said tube; outlet means for said hydrocarbon plus polyethylene and for water, alcohol and HCl from said collectors; and inlet and outlet means on bottom and top, respectively for said gas into and out of said vertical tube; said guide vanes, under the action of said gas, causing turbulent rotary motion of the liquids and producing a damming effect thereon thus continuously producing a film on the wall of said tube which immediately disperses under the shearing action of said gas and continuously reforms, thereby effecting a continuous interchange of liquid between said film and the dispersed phase.

References Cited by the Examiner

UNITED STATES PATENTS

| | | | |
|---|---|---|---|
| 2,088,497 | 7/1937 | Tijmatra | 23—310 |
| 2,585,385 | 2/1952 | Haller | 23—283 |
| 2,988,429 | 6/1961 | Cooley | 23—270.5 |
| 3,074,921 | 1/1963 | Carter | 260—94.95 |

MORRIS LIEBMAN, *Primary Examiner.*